United States Patent
Namiki et al.

(10) Patent No.: US 12,268,120 B2
(45) Date of Patent: Apr. 8, 2025

(54) AUTONOMOUS TRAVEL WORKING MACHINE AND CHARGING STATION

(71) Applicant: HONDA MOTOR CO., LTD., Tokyo (JP)

(72) Inventors: Takuma Namiki, Wako (JP); Kohei Matsuzawa, Wako (JP); Kenta Kawanishi, Wako (JP); Kotaro Nakamura, Wako (JP); Shuhei Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 863 days.

(21) Appl. No.: 17/442,223

(22) PCT Filed: Mar. 28, 2019

(86) PCT No.: PCT/JP2019/013571
§ 371 (c)(1),
(2) Date: Sep. 23, 2021

(87) PCT Pub. No.: WO2020/194656
PCT Pub. Date: Oct. 1, 2020

(65) Prior Publication Data
US 2022/0171402 A1  Jun. 2, 2022

(51) Int. Cl.
*A01D 34/00* (2006.01)
*A01D 34/78* (2006.01)
*A01D 101/00* (2006.01)
*B60L 53/16* (2019.01)

(52) U.S. Cl.
CPC ........... *A01D 34/008* (2013.01); *A01D 34/78* (2013.01); *B60L 53/16* (2019.02); *A01D 2101/00* (2013.01)

(58) Field of Classification Search
CPC .. A01D 34/008; A01D 34/78; A01D 2101/00; B60L 53/16
USPC .......................................................... 320/109
See application file for complete search history.

(56) References Cited

U.S. PATENT DOCUMENTS

2018/0212558 A1    7/2018  Meller et al.

FOREIGN PATENT DOCUMENTS

| CN | 102934565 A | * | 2/2013 | |
|---|---|---|---|---|
| CN | 102948301 B | | 2/2016 | |
| FR | 2828589 A1 | | 2/2003 | |
| JP | 6285979 | | 2/2018 | |
| WO | WO-2016104187 A1 | * | 6/2016 | ............. A01D 34/78 |

OTHER PUBLICATIONS

WO-2016104187-A1 (Ito et al.) (Jun. 30, 2016) (Machine Translation) (Year: 2016).*

(Continued)

*Primary Examiner* — Mahmoud Gimie
(74) *Attorney, Agent, or Firm* — Rankin, Hill & Clark LLP (57) ABSTRACT

In a lawn mower, one power receiving terminal is provided on a surface of the lawn mower, and the other power receiving terminal is disposed in a position where it sandwiches at least a part, such as the upper front portion, of a vehicle body with the one power receiving terminal. This configuration serves to suppress a situation in which moisture establishes electrical continuity between the pair of power receiving terminals.

9 Claims, 11 Drawing Sheets

(56) References Cited

OTHER PUBLICATIONS

International Search Report, Mailing Date: Jun. 18, 2019, 4 pages.
Written Opinion of the International Searching Authority dated Jun. 19, 2019 filed in PCT/JP2019/013571, 3 pages.
European Search Report dated Mar. 17, 2022, 9 pages.
International Preliminary Report on Patentability dated Oct. 7, 2021, 6 pages.

* cited by examiner

AUTONOMOUS TRAVEL WORKING MACHINE AND CHARGING STATION

TECHNICAL FIELD

The present invention relates to an autonomous travel working machine and a charging station.

BACKGROUND ART

An autonomous travel working machine is known, which can travel to a charging station by autonomous travel. As in Patent Literature 1, there is a known configuration in which a terminal portion that protrudes rearward is provided in a charging station, a recessed portion (a portion between a pair of power receiving terminals) into which the terminal portion of the charging station can be inserted is provided to a robot lawn mower which is a kind of autonomous travel working machine, inserting the terminal portion to the recessed portion electrically connects the robot lawn mower to the charging station, and the battery in the robot lawn mower is charged with the power from the charging station (for example, Patent Literature 1).

CITATION LIST

Patent Literature

[Patent Literature 1]
Japanese Patent No. 6285979

SUMMARY OF INVENTION

Technical Problem

Incidentally, when wet grass or raindrops adhere to a robot lawn mower, electrical continuity may be established between a pair of power receiving terminals through moisture. If the robot lawn mower and a charging station are connected to each other in this state, the pair of terminals provided on the charging station side is energized, which may hinder proper charging. When the terminals on the charging station side are energized, the positive terminals may be corroded due to bimetallic corrosion.

Therefore, an object of the present invention is to make it possible to suppress a situation in which electrical continuity is established between a pair of power receiving terminals through moisture.

Solution to Problem

To achieve the aforementioned object, an autonomous travel working machine capable of traveling to a charging station by autonomous travel includes: a vehicle body having a traveling function, and a pair of power receiving terminals electrically connected to the charging station, wherein one of the pair of power receiving terminals is provided on a surface of the autonomous travel working machine, and the other is provided in a position where the other sandwiches at least a part of the vehicle body with the one power receiving terminal.

The aforementioned configuration includes: a recessed portion that a part of the charging station can enter, wherein the pair of power receiving terminals are separately disposed out of the recessed portion and in the recessed portion.

The aforementioned configuration includes: a vehicle body cover that covers the vehicle body, wherein the pair of power receiving terminals are separately disposed in the vehicle body and the vehicle body cover.

In the aforementioned configuration, the one power receiving terminal has an upward-facing contact surface in contact with the charging station.

In the aforementioned configuration, the contact surface is an inclined surface that is inclined obliquely with respect to a horizontal plane.

In the aforementioned configuration, the one power receiving terminal has a protrusion portion extending downward, and the vehicle body cover has a slit through which the protrusion portion passes so that the protrusion portion is electrically connected to the vehicle body.

In the aforementioned configuration, a charging station for the autonomous travel working machine includes: a first plug unit that supports one power transmission terminal electrically connected to the one power receiving terminal, wherein the first plug unit has a drainage portion for draining moisture flowing over the one power transmission terminal to the outside.

The aforementioned configuration includes: an extension member that continues from the one power transmission terminal and extends diagonally downward from the power transmission terminal, wherein the first plug unit covers the one power transmission terminal and the extension member from above and opens downward, and a slit for draining moisture flowing diagonally downward along the extension member to the outside is included as the draining portion.

Advantageous Effects of Invention

According to aspects of the present invention, a situation in which electrical continuity is established between a pair of power receiving terminals through moisture can be suppressed.

DESCRIPTION OF EMBODIMENT

An embodiment of the present invention will now be described with reference to the accompanying drawings.

Figure 1:
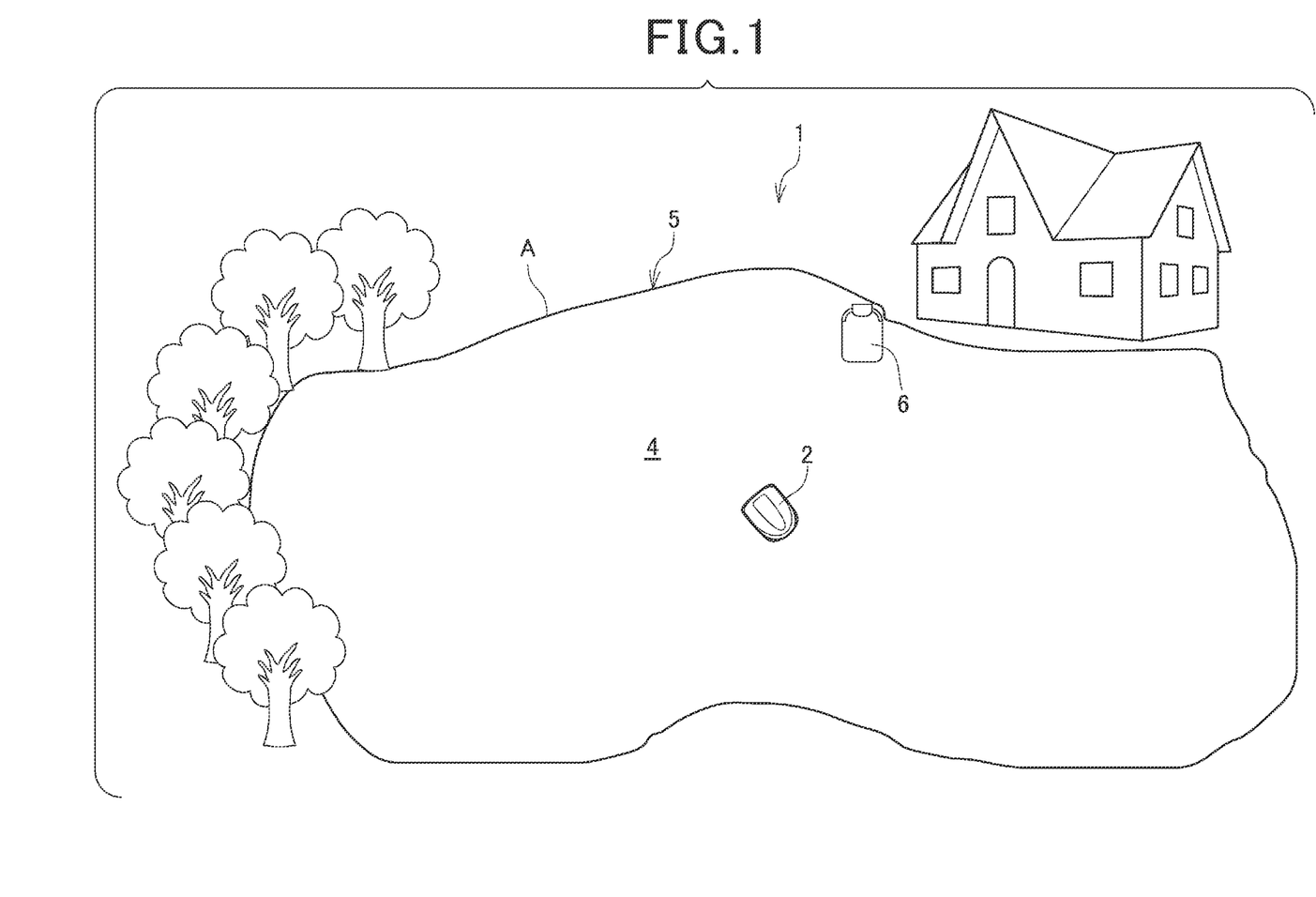
FIG. 1 is a diagram showing the configuration of an automated lawn mowing system according to an embodiment.

FIG. 1 is a diagram showing the configuration of an automated lawn mowing system 1 according to the embodiment.

The automated lawn mowing system 1 includes a robot lawn mower 2, an area wire 5 that defines a lawn mowing area 4 that is a work area, and a charging station 6.

The robot lawn mower 2 is an autonomous travel working machine that mows turf grass while automatically and autonomously running in the lawn mowing area 4 and is an example of an autonomous travel working machine or a self-propelled working machine. In the following description, the robot lawn mower 2 is referred to as "lawn mower 2".

The area wire 5 is installed so that the lawn mower 2 detects the boundary A of the lawn mowing area 4. The area wire 5 is laid along the boundary A and transmits a predetermined signal, and the lawn mower 2 detects the boundary A of the lawn mowing area 4 by detecting the signal from the area wire 5.

The charging station 6 is an apparatus that functions as a charging device for charging the lawn mower 2 as well as a standby place where the lawn mower 2 is put on standby when not working. The lawn mower 2 moves to the charging station 6 by autonomous travel, for example, at the end of the lawn mowing work, and is charged with the electric power supplied from the charging station 6. Note that the area wire 5 transmits a predetermined signal based on the electric power or signal supplied from the charging station 6.

Figure 2:
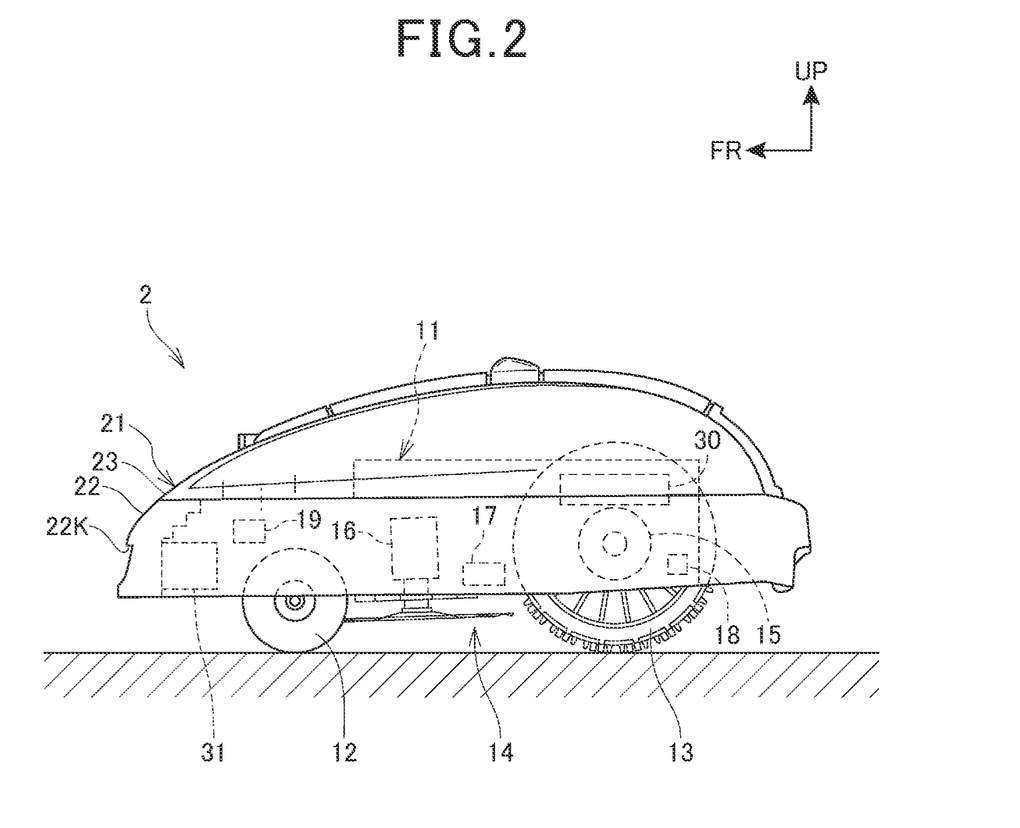
FIG. 2 is a diagram schematically showing the configuration of a lawn mower.

FIG. 2 is a diagram schematically showing the configuration of the lawn mower 2.

The lawn mower 2 includes a vehicle body 11 that has a traveling function and the like, and a vehicle body cover 21 that covers the vehicle body 11. Right and left front wheels 12 that can be steered to the right and left are provided at the front lower portion of the vehicle body 11, right and left rear wheels 13 that function as drive wheels are provided at the rear lower portion of the vehicle body 11, and a work unit 14 is provided at the central lower portion of the vehicle body 11.

In addition, a positive-side power receiving terminal 25 that is configured to be electrically connected to the charging station 6 is provided on an exposed surface (a top surface) of the lawn mower 2, and a terminal portion 31 that has a negative-side power receiving terminal 36, which will be described later, and is configured to be electrically connected to the charging station 6 is provided at the front portion of the lawn mower 2. The details of the positive-side power receiving terminal 25 and the terminal portion 31 will be described later.

The vehicle body 11 also serves as an electric unit that includes right and left traveling motors 15 that separately drive the right and left rear wheels 13, a work unit driving motor 16 that drives the work unit 14, a battery 17 that functions as a power source that supplies operation electric power to each component of the lawn mower 2, a wheel speed sensor 18 that detects the rotational speed of the right and left rear wheels 13 serving as drive wheels, a sensor unit 19 that detects the area wire 5 and the like, and a control unit 30 that controls each component of the lawn mower 2.

The control unit 30 controls the travel of the lawn mower 2 by controlling the driving of the traveling motor 15 and performs a predetermined operation by controlling the driving of the work unit driving motor 16. The work unit 14 of this embodiment is a cutting blade disc with a cutting blade, and can perform lawn mowing work when the cutting blade disc is rotated.

The control unit 30 specifies the position of the lawn mower 2 based on the results of detection by the wheel speed sensor 18 and the sensor unit 19, and controls the travel of the lawn mower 2 based on the specified position. Hence, it can travel so that the lawn in the lawn mowing area 4 may be appropriately mowed, and can move to the charging station 6 after completion of the lawn mowing work.

The configuration of a well-known robot lawn mower can be widely applied to the configuration of the lawn mower 2 except the positive-side power receiving terminal 25 and the terminal portion 31. For example, technology using a position detection device, such as GPS or a gyro sensor, or image recognition technology using a camera, or other technology may be used as technology for specifying the lawn mowing area 4, the charging station 6, the current position, and the like.

The vehicle body cover 21 includes a main cover 22 that covers at least the front portion of the vehicle body 11, and a top cover 23 that is coupled to the main cover 22 from above. The main cover 22 is formed as a cover that covers the front, rear, left, and right sides of the vehicle body 11 and opens a part of the vehicle body 11 upward, and is made of a resin material. The top cover 23 is formed as a cover that covers a portion where a part of the vehicle body 11 in the main cover 22 is opened, and is made of a resin material. These covers 22 and 23 function as a protective cover for preventing rainwater and dust from adhering to the vehicle body 11 and a decorative cover for improving the appearance.

Note that the material for the vehicle body cover 21 is not limited to resin. In the case where the lawn mower 2 is compact, the main cover 22 and the top cover 23 may be integrally formed.

Figure 3:
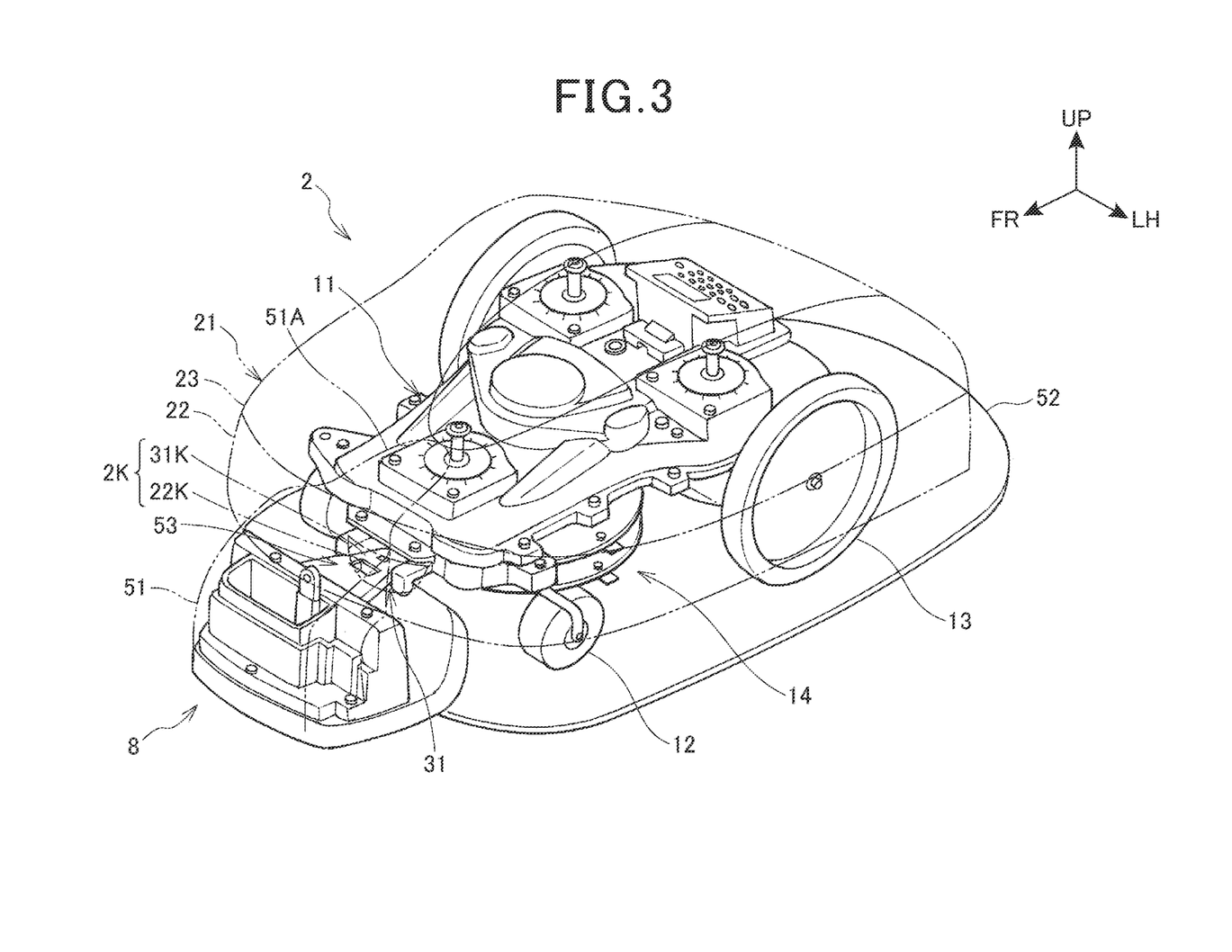
FIG. 3 is a diagram showing the state in which the lawn mower and a charging station are electrically connected.
Figure 4:
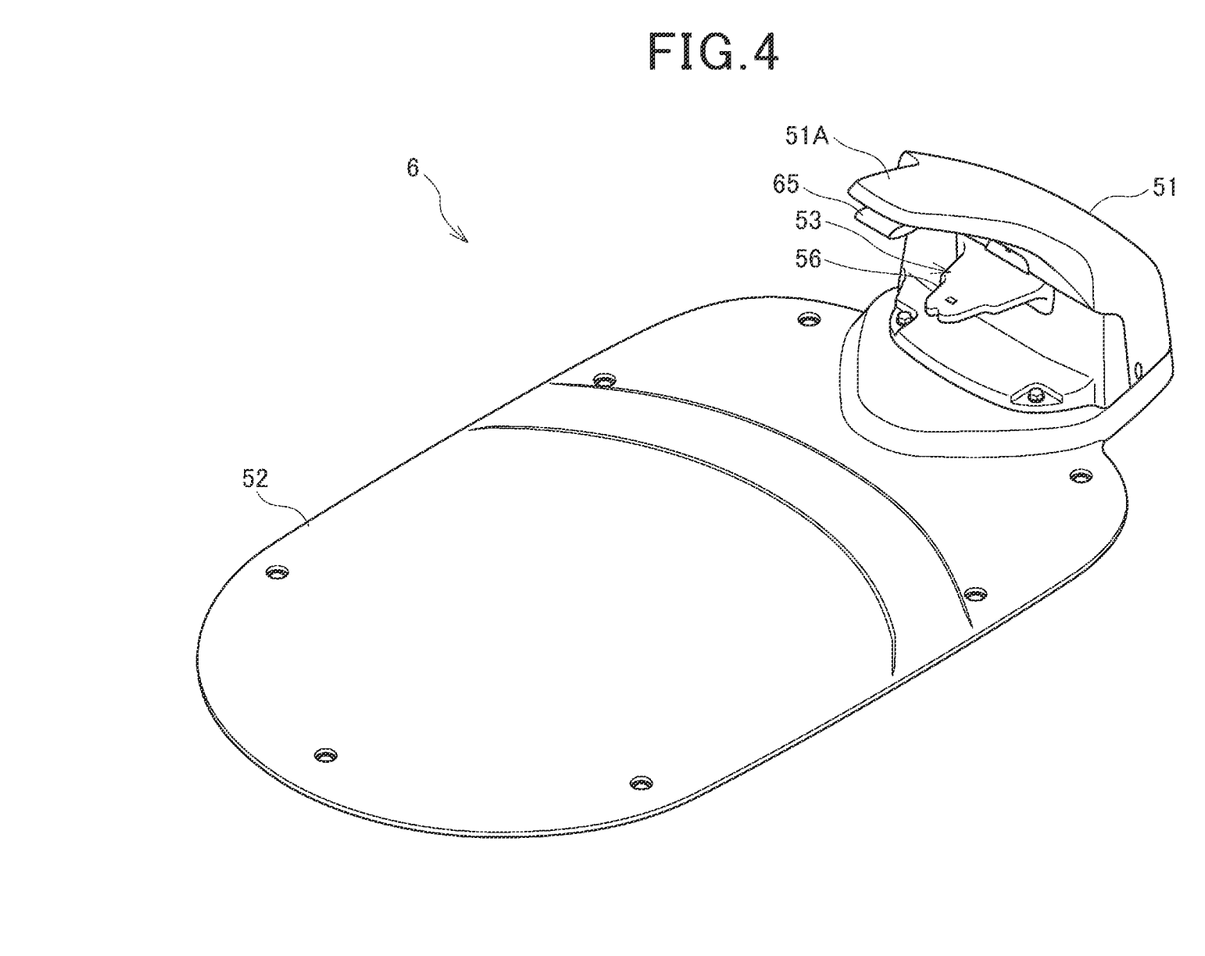
FIG. 4 is a perspective view of the charging station.

FIG. 3 is a diagram showing the state in which the lawn mower 2 and the charging station 6 are electrically connected to each other. For convenience of explanation, the vehicle body cover 21 is indicated by the two-dot chain line in FIG. 3. FIG. 4 is a perspective view of the charging station 6.

As shown in FIGS. 3 and 4, the charging station 6 includes a connection base 51 to which the lawn mower 2 is connected, and a mounting base 52 on which the lawn mower 2 connected to the connection base 51 is mounted. The connection base 51 has an extension portion 51A that extends diagonally upward to a position where the positive-side power receiving terminal 25 of the lawn mower 2 is supposed to be. The connection base 51 has a plug unit 53 protruding toward the lawn mower 2 on the mounting base 52 and a positive-side power transmission terminal 65 (see FIG. 4) that is provided on the extension portion 51A and configured to be electrically connected to the positive-side power receiving terminal 25.

Figure 5:
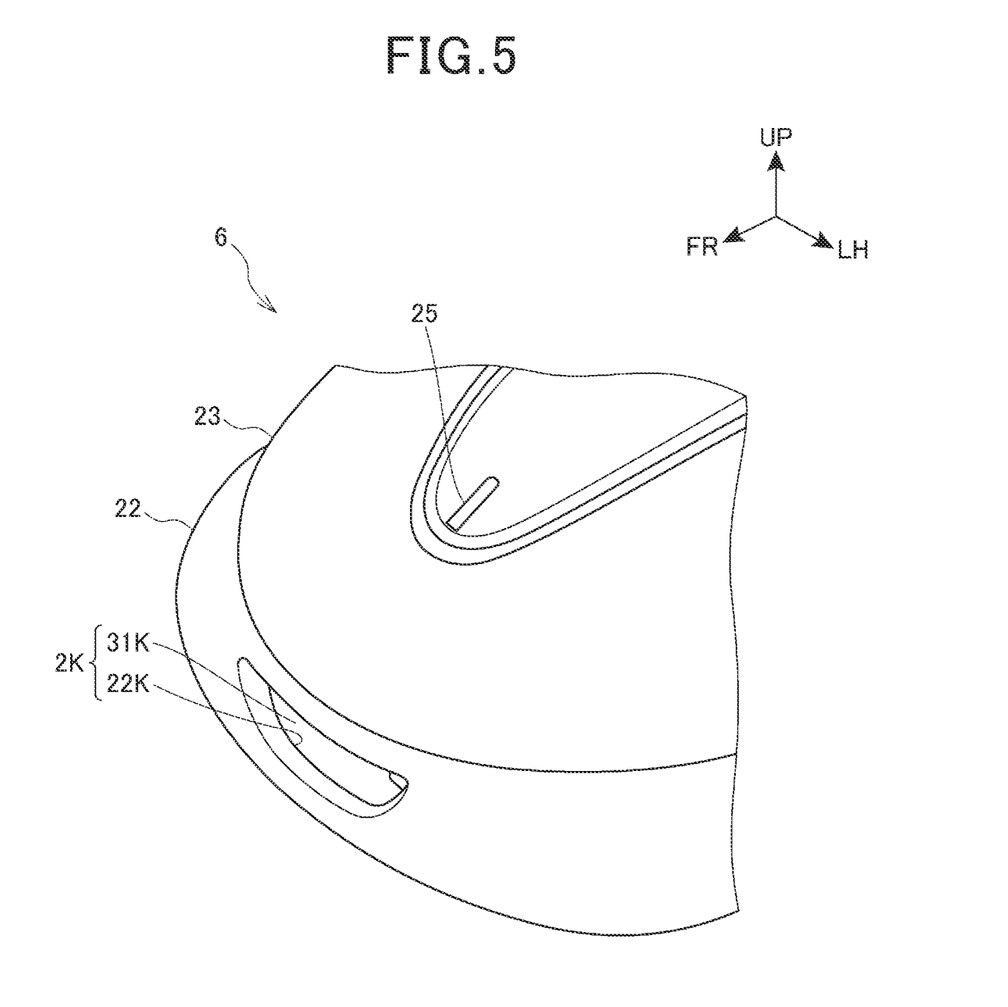
FIG. 5 is a diagram of the lawn mower viewed from the front upper side.

FIG. 5 is a diagram of the lawn mower 2 viewed from the front upper side.

As shown in FIGS. 3 and 5, an opening 22K that allows the plug unit 53 to be inserted toward the terminal portion 31 is provided in the front surface of the main cover 22 of the lawn mower 2. A space 31K into which the plug unit 53 can be inserted is provided between the opening 22K and the terminal portion 31. The opening 22K and the space 31K define a recessed portion 2K that allows the plug unit 53, which is a part of the charging station 6, to be inserted into the terminal portion 31.

As shown in FIG. 5, the positive-side power receiving terminal 25 is provided in the center with reference to the left and right directions of the main cover 22, and is exposed toward the upper front of the lawn mower 2. The positive-side power receiving terminal 25 is inclined obliquely to the horizontal plane so that moisture such as rainwater on it can be quickly dropped by gravity.

Figure 6:
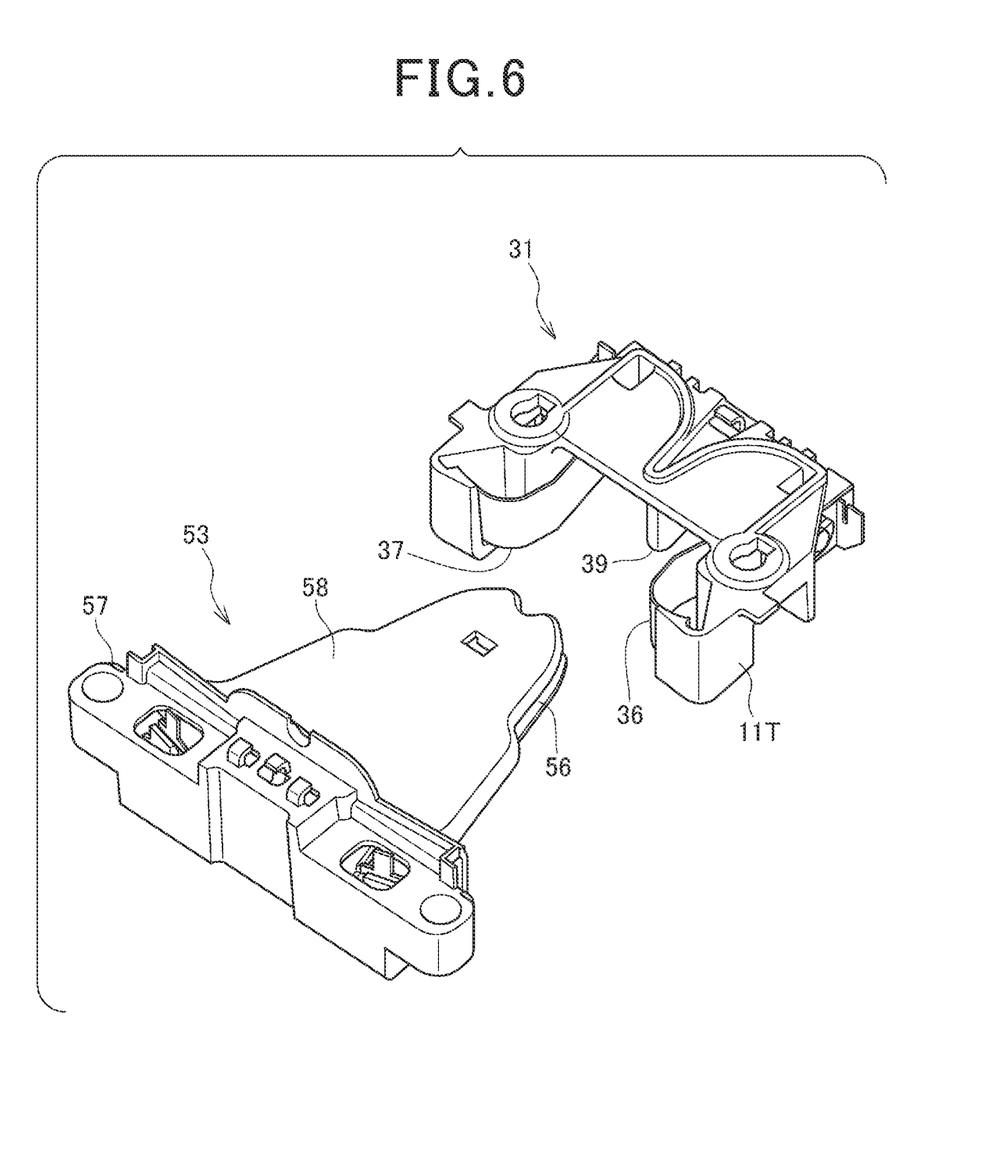
FIG. 6 is a perspective view showing a plug unit and a terminal portion.

FIG. 6 is a perspective view showing the plug unit 53 and the terminal portion 31. The plug unit 53 has a triangular shape that narrows rearward when viewed from above and includes a negative-side power transmission terminal 56. To be specific, the plug unit 53 integrally includes a basal section 57 connected to the connection base 51, and a unit body 58 having a triangular shape when viewed from above and extending from the basal section 57.

The negative-side power transmission terminal 56 is a terminal that projects outwardly to the left and right on one side of the left and right sides of the unit body (the side corresponding to the left side of the lawn mower 2 in this embodiment) and at the tip of the unit body 58. Since the negative-side power transmission terminal 56 is provided on a side surface of the plug unit 53, even if moisture such as rainwater adheres thereto, it can be quickly dropped by gravity.

Figure 7:
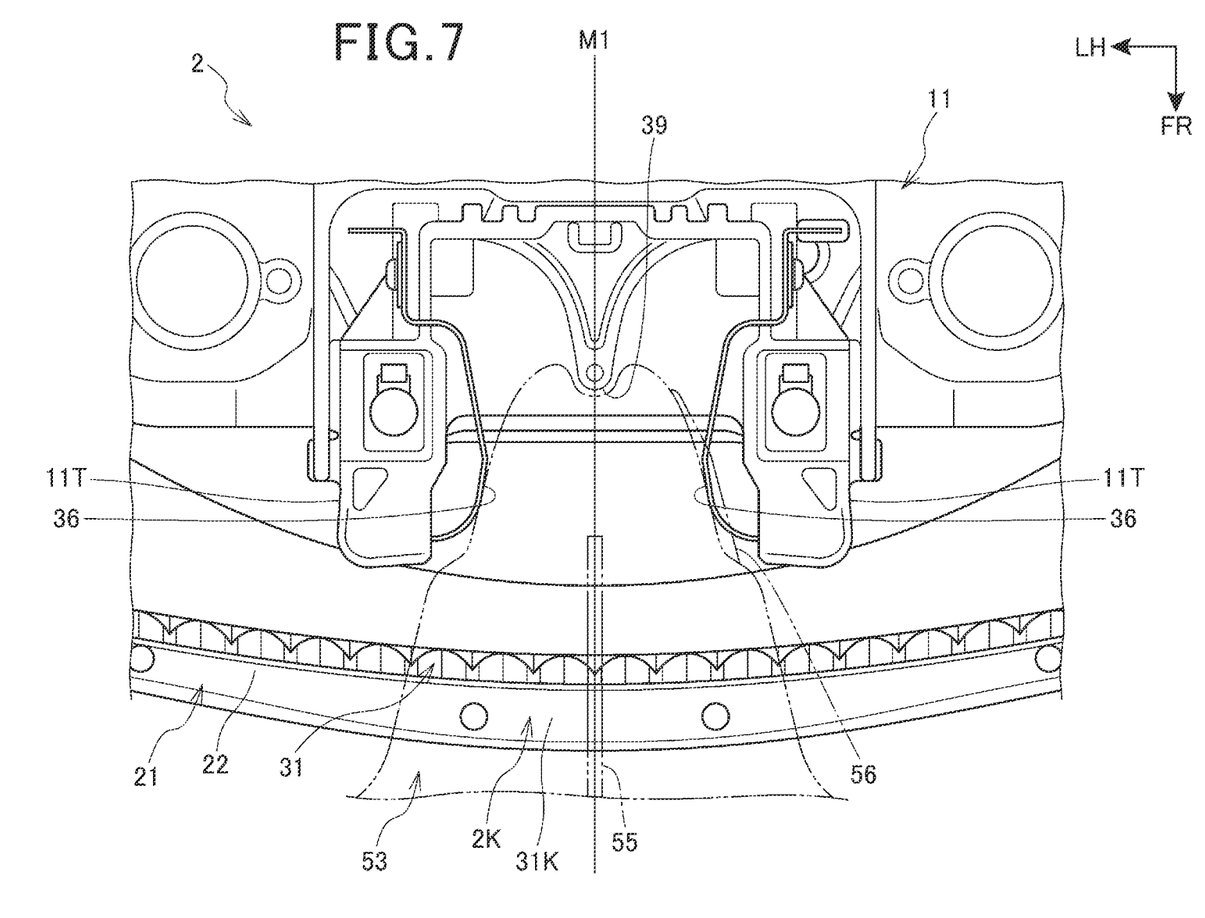
FIG. 7 is a diagram of the terminal portion viewed from the bottom of the lawn mower.

FIG. 7 is a diagram of the terminal portion 31 viewed from the bottom of the lawn mower 2. For convenience of explanation, in FIG. 7, the plug unit 53 inserted to the bottom of the recessed portion 2K is indicated by the two-dot chain line.

As shown in FIG. 7, the terminal portion 31 has the negative-side power receiving terminal 36 provided on the vehicle body 11, and a dummy terminal 37 opposed to the negative-side power receiving terminal 36.

The negative-side power receiving terminal 36 is attached to a front projecting portion 11T that constitutes a part of the foremost portion of the vehicle body 11 at the bottom of the recessed portion 2K, and is, in the bottom view shown in FIG. 7, a metal plate that curves in a U-shape from one of the right and left sides (in this embodiment, the right side in FIG. 7) to the other one of the right and left sides (the left side in FIG. 7). In other words, the negative-side power receiving terminal 36 is disposed in a position shifted to one of the right and left sides from the center plane Ml of the vehicle body 11 when viewed along the right and left direction (coinciding with the center plane of the lawn mower 2 when viewed along the right and left direction), and has a laterally (leftward in FIG. 7) facing contact surface that comes in contact with the negative-side power transmission terminal 56.

The negative-side power receiving terminal 36 is provided in the position that overlaps with the negative-side power transmission terminal 56 of the plug unit 53 when the plug unit 53 is inserted to the position indicated by the two-dot chain line shown in FIG. 7. The negative-side power receiving terminal 36 curves in a U shape and deforms so that the pressure of contact with the negative-side power transmission terminal 56 does not become excessive, thereby keeping an appropriate state of contact between the terminals 36 and 56. Note that the negative-side power transmission terminal 56 side may be made deformable.

As shown in FIG. 7, the dummy terminal 37 facing the negative-side power receiving terminal 36 and the structure supporting the dummy terminal 37 are formed symmetrically with respect to the negative-side power receiving terminal 36 and its peripheral structure. To be specific, the dummy terminal 37 and its support structure are formed in positions and structures that are symmetric with respect to the center plane Ml of the vehicle body 11 when viewed along the right-left direction. Since the plug unit 53 is inserted between the dummy terminal 37 and the negative-side power receiving terminal 36, it is easy to guide the direction of the lawn mower 2 travelling toward the plug unit 53 to an appropriate direction or keep an appropriate state of the contact between the negative-side power receiving terminal 36 and the negative-side power transmission terminal 56.

In addition, the terminal portion 31 is provided with a contact portion 39 that the tip of the plug unit 53 comes in contact with. The contact portion 39 is provided in the position that the plug unit 53 comes in contact with when the negative-side power receiving terminal 36 of the terminal portion 31 and the negative-side power transmission terminal 56 of the plug unit 53 are electrically connected to each other.

In this configuration, the negative-side power receiving terminal 36 is provided on the relatively bottom side in the recessed portion 2K, so that wet grass or raindrops are unlikely to adhere to the negative-side power receiving terminal 36. Besides, the negative-side power receiving terminal 36 and the positive-side power receiving terminal 25 are separately disposed in the vehicle body cover 21 and the vehicle body 11, so that the continuity route straddling between the both terminals 36 and 25 can be made long, and the movement of moisture at the boundary between the vehicle body cover 21 and the vehicle body 11 can be suppressed easily.

Even if wet grass or moisture adheres to the negative-side power receiving terminal 36, since the negative-side power receiving terminal 36 and the negative-side power transmission terminal 56 rub against each other, wiping action for removing foreign matters such as moisture from the contact surfaces of the both terminals 36 and 56 can be effectively generated.

Figure 8:
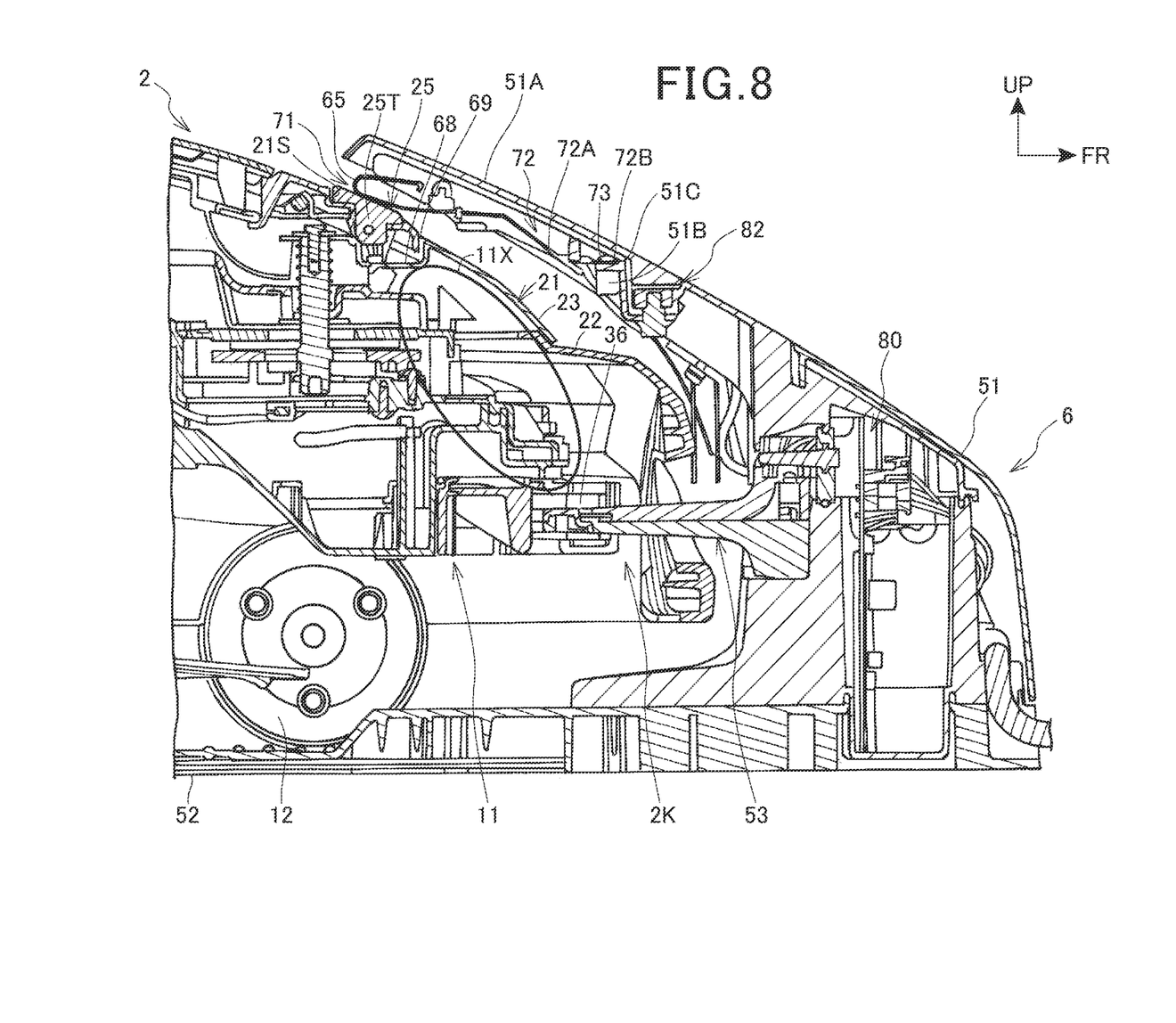
FIG. 8 is a side sectional view showing the state in which the lawn mower and the charging station are electrically connected.

The positive-side power receiving terminal 25 and positive-side power transmission terminal 65 of the lawn mower 2 will now be described. FIG. 8 is a side sectional view showing the state in which the lawn mower 2 and the charging station 6 are electrically connected. As shown in FIG. 8, the positive-side power receiving terminal 25 is a metal plate whose upper surface is inclined forward and downward.

Figure 9:
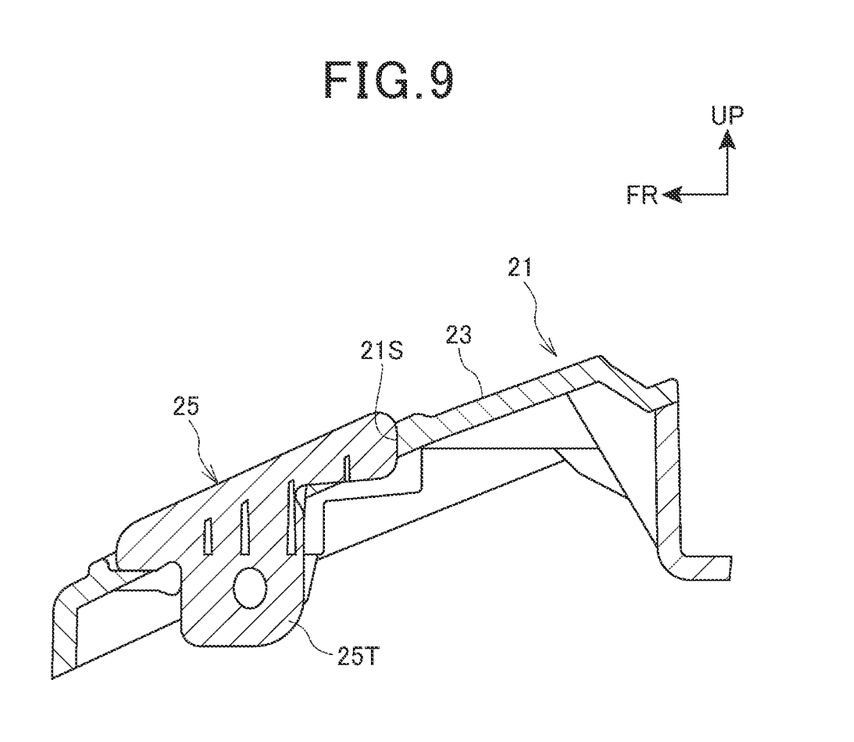
FIG. 9 is a diagram showing a positive-side power receiving terminal and the peripheral structure.

FIG. 9 is a diagram showing the positive-side power receiving terminal 25 and the peripheral structure. As shown in FIG. 9, the positive-side power receiving terminal 25 has a T-shape in a side view, and a protrusion portion 25T located at the center of the positive-side power receiving terminal 25 when viewed along the front-rear direction extends downward. The protrusion portion 25T is inserted into a slit 21S provided in the vehicle body cover 21, and when the protrusion portion 25T passes through the slit 21S, the protrusion portion 25T is electrically connected to the vehicle body 11 in the vehicle body cover 21. Moreover, the positive-side power receiving terminal 25 is fixed to the vehicle body cover 21 when the portions of the positive-side power receiving terminal 25 located in front of and behind a protrusion portion 67 are hung on the vehicle body cover 21.

As shown in FIG. 8, the main cover 22 has a water receiving portion 68 for receiving water falling downward through the positive-side power receiving terminal 25, and a drainage opening 69 for draining water accumulated in the water receiving portion 68 out of the main cover 22. The moisture flown out of the drainage opening 69 is drained out of the lawn mower 2 along the upper surface of the main cover 22.

The positive-side power receiving terminal 25 is provided in the position that the positive-side power transmission terminal 65 of the extension portion 51A comes in contact with when the negative-side power receiving terminal 36 of the terminal portion 31 and the negative-side power transmission terminal 56 of the plug unit 53 are electrically connected. As shown in FIG. 8, the contact surfaces where the positive-side power receiving terminal 25 and the positive-side power transmission terminal 65 come into contact with each other are inclined surfaces inclined diagonally forward and downward, so that moisture is unlikely to remain on each contact surface, both terminals 25 and 65 can be easily brought into contact with each other without moisture, and corrosion between metals can be effectively suppressed.

Moreover, in this configuration, as shown in FIG. 8, the positive-side power receiving terminal 25 of the lawn mower 2 is provided across the upper front portion of the vehicle body 11 (the portion indicated by the reference numeral 11X in FIG. 8) from the negative-side power receiving terminal 36 of the lawn mower 2, which effectively suppresses a situation in which the pair of power receiving terminals 25 and 36 are connected through wet grass or moisture.

Figure 10:
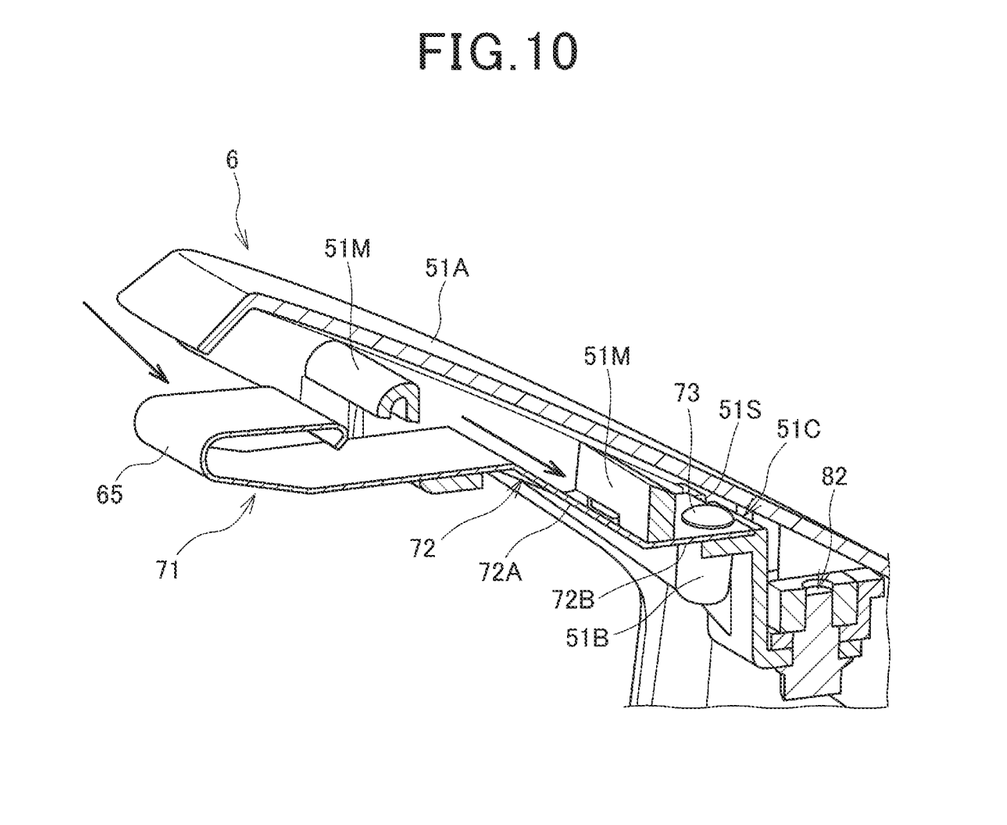
FIG. 10 is a diagram showing the internal structure of an extension portion of the charging station from diagonally above.
Figure 11:
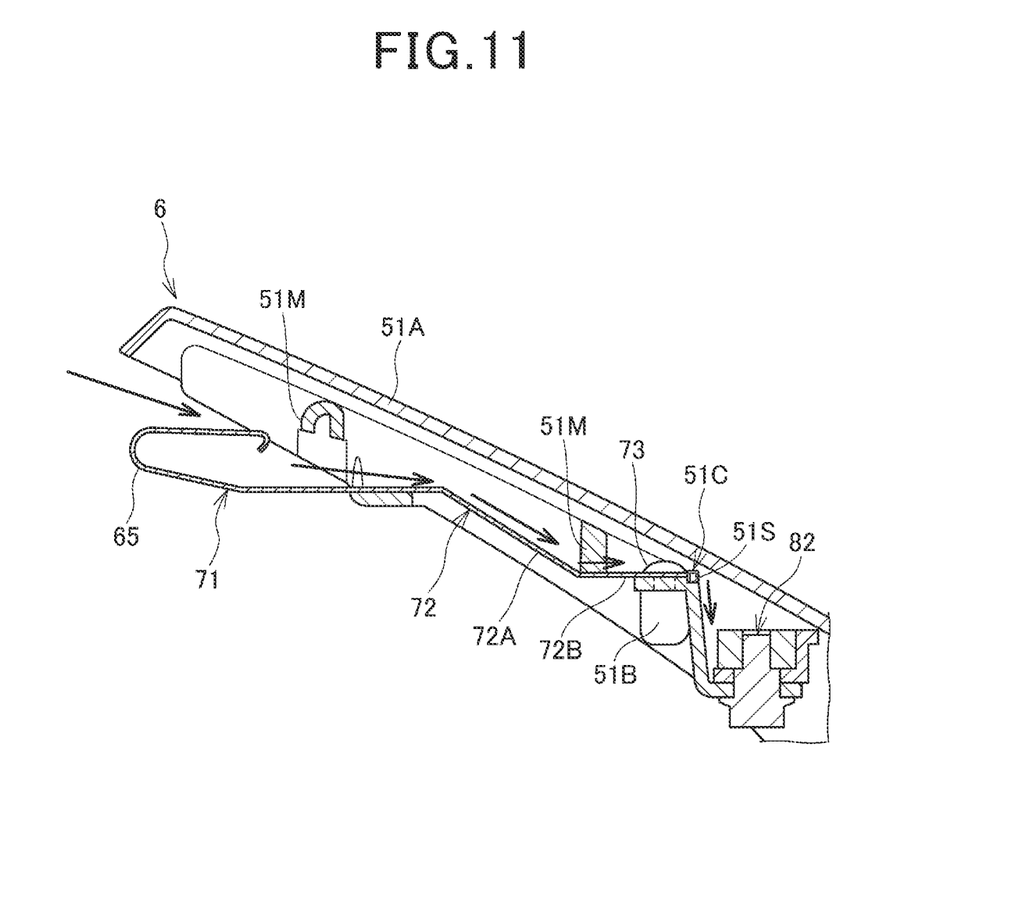
FIG. 11 is a diagram showing a side sectional view of the extension portion.

FIG. 10 is a diagram showing the internal structure of the extension portion 51A of the charging station 6 from diagonally above, and FIG. 11 is a diagram showing a side sectional view of the extension portion 51A.

In the lawn mower 2, the extension portion 51A functions as a first plug unit having a positive-side power transmission terminal 65, and the aforementioned plug unit 53 functions as a second plug unit having a negative-side power transmission terminal 56.

As shown in FIGS. 10 and 11, the positive-side power transmission terminal 65 is formed by bending a part of a conductive member 71 which is a metal plate. The conductive member 71 integrally includes a positive-side power transmission terminal 65 and an extension member 72 extending diagonally downward from the positive-side power transmission terminal 65 toward the opposite side from the lawn mower 2 (right to the viewer of FIGS. 10 and 11).

To be specific, the rear end of the conductive member 71 (the end on the lawn mower 2 side) has a U-shape that curves rearwardly in a convex form, and this U-shaped part functions as a positive-side power transmission terminal 65. Further, the conductive member 71 integrally includes, as an extension member 72, a plate-like first extension portion 72A extending diagonally downward from the positive-side power transmission terminal 65 toward the front (the opposite side from the lawn mower 2) and a plate-like second extension portion 72B that extends forward from the first extension portion 72A and is fastened to the extension portion 51A through the fastening member 73.

The extension portion 51A has a shape that covers the conductive member 71 from above and opens at the bottom, and is made of, for example, a resin. This extension portion 51A integrally includes a support member 51B that supports the second extension portion 72B from below and the fastening member 73 is fastened to, and a wall member 51C that the second extension portion 72B supported by the support member 51B comes in contact with and that rises higher than the second extension portion 72B.

As shown in FIG. 11, in the conductive member 71 with such features, since the positive-side power transmission terminal 65 is at the highest position in the conductive member 71, moisture such as rainwater from the extension portion 51A does not flow to the positive-side power transmission terminal 65.

Meanwhile, when moisture such as rainwater is blown into below the extension portion 51A, the moisture may adhere to the positive-side power transmission terminal 65. In this case, as shown by the arrows in FIGS. 10 and 11, the moisture flows from the positive-side power transmission terminal 65 to the first extension portion 72A and then the second extension portion 72B, so that moisture such as rainwater is not likely to stay at the positive-side power transmission terminal 65.

Here, as shown in FIGS. 10 and 11, the wall member 51C comes in contact with the end surface of the second extension portion 72B on the other side from the positive-side power transmission terminal 65, and dams up the moisture flowing to the second extension portion 72B. This blocks the flow of water from the extension portion 51A of the charging station 6 to the front side of the extension portion 51A and prevents the intrusion of water into a substrate 80 (see FIG. 8) or the like provided in the connection base 51.

A slit 51S (see FIG. 10) recessed downward is provided at the upper end of the wall member 51C. Therefore, the moisture dammed by the wall member 51C is drained out of the wall member 51C through the slit 51S. In this case, water passing through the slit 51S falls down along the wall member 51C, and the water can be drained to below the extension portion 51A. In other words, the slit 51S functions as a drainage portion for draining the water from the positive-side power transmission terminal 65.

As shown in FIG. 10, the slit 51S is formed closer to the side wall of the extension portion 51A, and the moisture passing through the slit 51S drops along the wall member 51C and/or the side wall of the extension portion 51A. The number of slits 51S is not limited to one and multiple slits 51S may be provided at intervals. Further, the side wall of the extension portion 51A may have a through hole or the like for draining the moisture passing through the slit 51S out of the extension portion 51A to the left and right.

In FIG. 10, the reference numeral 82 represents a cable ground into which electric wiring (not shown) extending from the positive-side power transmission terminal 65 is inserted. The cable ground 82 tightens the electric wiring to prevent entry of dust and water. Even if moisture from the slit 51S flows to the cable ground 82 side, with the cable ground 82, water does not enter the wiring portion.

In this configuration, as shown in FIGS. 10 and 11, only one end of the conductive member 71 is fixed to the extension portion 51A through the fastening member 73, so that the conductive member 71 is cantilevered and the other end of the conductive member 71 can swing up and down due to elastic deformation.

Here, the extension portion 51A is provided with multiple bridge portions 51M for bridging between the left and right side walls of the extension portion 51A in order to secure the strength of the extension portion 51A. These bridge portions 51M are provided at intervals above the conductive member 71 and between the extension portion 51A and the conductive member 71. Consequently, the upward swing of the conductive member 71 is not blocked by the bridge portions 51M, and the positive-side power transmission terminal 65 and the positive-side power receiving terminal 25 can be easily brought into contact with each other with an appropriate contact pressure. Further, the bridge portions 51M do not hinder the flow of moisture along the upper surface of the conductive member 71 or do not hinder moisture dropping from the conductive member 71.

As described above, the lawn mower 2 of this embodiment has a terminal layout in which one of the pair of power receiving terminals 25 and 36 is provided on a surface of the lawn mower 2, and the other is provided in a position where it sandwiches at least a part (the upper front portion 11X in FIG. 8) of the vehicle body 11 with the one power receiving terminal 25. With this layout, even if wet grass or moisture adheres to the power receiving terminal 25 on the surface of the lawn mower 2 during autonomous travel, the situation where electrical continuity is established between the power receiving terminals 25 and 36 through wet grass or moisture can be suppressed. Accordingly, a situation where electrical continuity is established between the pair of power transmission terminals 65 and 56 and proper charging is not achieved, and the corrosion between metal can be effectively suppressed.

In addition, the lawn mower 2 has the recessed portion 2K that the plug unit 53, which is a part of the charging station 6, can enter, and the pair of power receiving terminals 25 and 36 are separately disposed out of the recessed portion 2K and inside the recessed portion 2K, which suppresses more the situation where electrical continuity is established between the power receiving terminals 25 and 36 through wet grass or moisture and the situation where electrical continuity is established between the pair of power transmission terminals 65 and 56 and proper charging is not achieved, for example.

Furthermore, the pair of power receiving terminals 25 and 36 are separately disposed in the vehicle body cover 21 and the vehicle body 11, which are different parts among the multiple parts of the lawn mower 2, so that movement of the moisture at the boundary between the components can be easily canceled. This can also suppress more the situation where electrical continuity is established between the power receiving terminals 25 and 36 through wet grass or moisture and proper charging is not achieved, for example.

Note that the pair of power receiving terminals 25 and 36 are not necessarily separately disposed in the vehicle body cover 21 and the vehicle body 11, and may be separately disposed in other different parts of the lawn mower 2.

Further, the power receiving terminal 25 provided on the surface of the lawn mower 2 has the contact surface in contact with the charging station 6 and facing upward, so that the power receiving terminal 25 can be easily visually recognized from the outside. In this case, the wiping action related to the power transmission terminal 65 on the charging station 6 side makes it easier to clean the upward-facing contact surface of the power receiving terminal 25 and remove moisture or the like from the contact surface. Moreover, since the contact surface of the power receiving terminal 25 is an inclined surface that is inclined obliquely with respect to the horizontal plane, even if moisture such as rainwater adheres to it, the moisture can be quickly removed by gravity.

Further, as shown in FIG. 9, the power receiving terminal 25 has a protrusion portion 25T extending downward, and the vehicle body cover 21 has a slit 21S through which the protrusion portion 25T passes so that the protrusion portion 25T is electrically connected to the vehicle body 11 in the vehicle body cover 21; thus, the power receiving terminal 25 and the vehicle body 11 can be electrically connected with a simple configuration. Note that the shape of each part of the power receiving terminal 25 including the protrusion portion 25T may be changed as appropriate.

Further, as shown in FIGS. 10 and 11, the charging station 6 has an extension portion 51A that functions as a first plug unit that supports the one power transmission terminal 65 electrically connected to the power receiving terminal 25 on the surface of the lawn mower 2, and the extension portion 51A has a slit 51S that functions as a drainage portion for draining moisture flowing over the power transmission terminal 65; thus, even if moisture such as rainwater adheres to the power transmission terminal 65, it can be quickly drained to an appropriate spot.

It also has an extension member 72 that continues from the power transmission terminal 65 and extends diagonally downward from the power transmission terminal 65, and the extension portion 51A of the charging station 6 covers the power transmission terminal 65 and the extension member 72 from above and opens downward; thus, the extension portion 51A does not prevent the moisture from dropping from the power transmission terminal 65 and the extension member 72. Besides, since the slit 51S drains moisture flowing diagonally downward along the extension member 72 to the outside, the moisture adhering to the power transmission terminal 65 and the extension member 72 can be guided to the slit 51S and efficiently drained. Note that the shape and position of the slit 51S may be changed as appropriate. Moreover, the drainage portion is not limited to the slit 51S and known structures capable of draining moisture adhering to the power transmission terminal 65 and the extension member 72 may be widely adopted as the drainage portion.

Each embodiment is merely one embodiment of the present invention, and any modification and application can be made without departing from the scope of the present invention.

For example, the above-described embodiment has described the case where the power receiving terminal 25 is disposed on the upper surface of the lawn mower 2; however, this is not necessarily the case and it may be disposed on the side surface of the lawn mower 2 or any other appropriate spots as long as it is on the surface of the lawn mower 2. Although the case where the power receiving terminal 36 is disposed in the recessed portion 2K at the front of the lawn mower 2 has also been described, this is not necessarily the case and it may be disposed in any appropriate position as long as it sandwiches at least a part of the vehicle body 11 with the power receiving terminal 25.

Although the case where the power receiving terminals 25 and 36 are separately disposed in the vehicle body cover 21 and the vehicle body 11 has also been described, this is not necessarily the case and they may be disposed in the same part, the vehicle body cover 21 or vehicle body 11, as long as at least a part of the vehicle body 11 is sandwiched between the power receiving terminals 25 and 36.

Although the case where the present invention is applied to the lawn mower 2 and the charging station 6 shown in FIG. 1 and other drawings has been described, the present invention may be applied to other known lawn mowers and charging stations. Moreover, the present invention is applicable not only to lawn mowers but to various autonomous travel working machines that can move to a charging station by autonomous travel.

REFERENCE SIGNS LIST

1 Automated lawn mowing system
2 Robot lawn mower (autonomous travel working machine)
2K Recessed portion
4 Lawn mowing area
5 Area wire
6 Charging station
11 Vehicle body
12 Front wheel
13 Rear wheel 14 Work unit
21 Vehicle body cover
21S Slit
22 Main cover
22K Opening
23 Top cover
25 Positive-side power receiving terminal
25T Protrusion portion of positive-side power receiving terminal
31 Terminal portion
31K Space
36 Negative-side power receiving terminal
37 Dummy terminal
51 Connection base
51A Extension portion (first plug unit)
51B Support member
51C Wall member
51S Slit (drainage portion)
52 Mounting base
53 Plug unit (second plug unit)
56 Negative-side power transmission terminal
58 Unit body
65 Positive-side power transmission terminal
71 Conductive member
72A First extension portion
72B Second extension portion

The invention claimed is:

1. An autonomous travel working machine capable of traveling to a charging station by autonomous travel, the autonomous travel working machine comprising:
a vehicle body having a traveling function, and a pair of power receiving terminals to be electrically connected to the charging station, wherein
one of the pair of power receiving terminals is provided on a surface of the autonomous travel working machine, and the other is provided in a position where the other sandwiches at least a part of the vehicle body with the one power receiving terminal,
wherein the one power receiving terminal has an upward-facing contact surface in contact with the charging station, and
wherein the contact surface is an inclined surface that is inclined obliquely with respect to a horizontal plane.

2. The autonomous travel working machine according to claim 1, comprising:
a recessed portion that a part of the charging station can enter, wherein
the pair of power receiving terminals are separately disposed out of the recessed portion and in the recessed portion.

3. The autonomous travel working machine according to claim 1, comprising:
a vehicle body cover that covers the vehicle body, wherein
the pair of power receiving terminals are separately disposed in the vehicle body and the vehicle body cover.

4. The autonomous travel working machine according to claim 2, comprising:
a vehicle body cover that covers the vehicle body, wherein
the pair of power receiving terminals are separately disposed in the vehicle body and the vehicle body cover.

5. The autonomous travel working machine according to claim 2, wherein
the one power receiving terminal has a protrusion portion extending downward, and
the vehicle body cover has a slit through which the protrusion portion passes so that the protrusion portion is electrically connected to the vehicle body.

6. The autonomous travel working machine according to claim 3, wherein
the one power receiving terminal has a protrusion portion extending downward, and
the vehicle body cover has a slit through which the protrusion portion passes so that the protrusion portion is electrically connected to the vehicle body.

7. An autonomous travel working machine capable of traveling to a charging station by autonomous travel, the autonomous travel working machine comprising:
a vehicle body having a traveling function, and a pair of power receiving terminals to be electrically connected to the charging station, wherein
one of the pair of power receiving terminals is provided on a surface of the autonomous travel working machine, and the other is provided in a position where the other sandwiches at least a part of the vehicle body with the one power receiving terminal, wherein
the one power receiving terminal has a protrusion portion extending downward, and
the vehicle body cover has a slit through which the protrusion portion passes so that the protrusion portion is electrically connected to the vehicle body.

8. An autonomous travel working machine capable of traveling to a charging station by autonomous travel, the autonomous travel working machine comprising:
a vehicle body having a traveling function, and a pair of power receiving terminals to be electrically connected to the charging station, wherein
one of the pair of power receiving terminals is provided on a surface of the autonomous travel working machine, and the other is provided in a position where the other sandwiches at least a part of the vehicle body with the one power receiving terminal,
the charging station comprising:
a first plug unit that supports one power transmission terminal is electrically connected to the one power receiving terminal, wherein
the first plug unit has a drainage portion for draining moisture flowing over the one power transmission terminal to the outside.

9. The charging station according to claim 8, comprising:
an extension member that continues from the one power transmission terminal and extends diagonally downward from the power transmission terminal, wherein
the first plug unit covers the one power transmission terminal and the extension member from above and opens downward, and
a slit for draining moisture flowing diagonally downward along the extension member to the outside is included as the draining portion.

* * * * *